United States Patent
Weedon et al.

(10) Patent No.: US 7,470,459 B1
(45) Date of Patent: Dec. 30, 2008

(54) ULTRA HIGH MOLECULAR WEIGHT POLYETHYLENE BALLISTIC STRUCTURES

(75) Inventors: Gene C. Weedon, Richmond, VA (US); Charles Paul Weber, Jr., Monroe, NC (US); Kenneth C. Harding, Midlothian, VA (US)

(73) Assignee: BAE Systems Tensylon H.P.M., Inc, Monroe, NC (US)

( * ) Notice: Subject to any disclaimer, the term of this patent is extended or adjusted under 35 U.S.C. 154(b) by 0 days.

(21) Appl. No.: 12/012,271

(22) Filed: Feb. 1, 2008

Related U.S. Application Data

(60) Continuation of application No. 11/217,277, filed on Sep. 1, 2005, now Pat. No. 7,348,053, which is a continuation-in-part of application No. 10/926,681, filed on Aug. 25, 2004, now Pat. No. 6,951,685, which is a division of application No. 09/999,083, filed on Nov. 27, 2001, now abandoned.

(51) Int. Cl.
*B32B 3/06* (2006.01)

(52) U.S. Cl. .......... 428/103; 428/297.7; 428/911
(58) Field of Classification Search ........... 428/103, 428/297.7, 911; 2/2.5, 5
See application file for complete search history.

(56) References Cited

U.S. PATENT DOCUMENTS

| | | | | |
|---|---|---|---|---|
| 4,709,850 | A * | 12/1987 | Wagner | 229/303 |
| 5,093,197 | A * | 3/1992 | Howard et al. | 428/372 |
| 5,578,373 | A * | 11/1996 | Kobayashi et al. | 428/364 |
| 6,951,685 | B1 * | 10/2005 | Weedon et al. | 428/364 |
| 7,348,053 | B1 * | 3/2008 | Weedon et al. | 428/297.7 |
| 2002/0049269 | A1 * | 4/2002 | HO et al. | 524/186 |
| 2002/0132923 | A1 * | 9/2002 | Langohr et al. | 525/191 |
| 2005/0197020 | A1 * | 9/2005 | Park et al. | 442/36 |
| 2005/0203232 | A1 * | 9/2005 | Rolland et al. | 524/425 |

* cited by examiner

*Primary Examiner*—N. Edwards

(57) ABSTRACT

Ballistic panels formed by the lamination of highly oriented ultra high molecular weight poly(ethylene) slit films and sheets useful in the fabrication of ballistic containers are described.

12 Claims, 4 Drawing Sheets

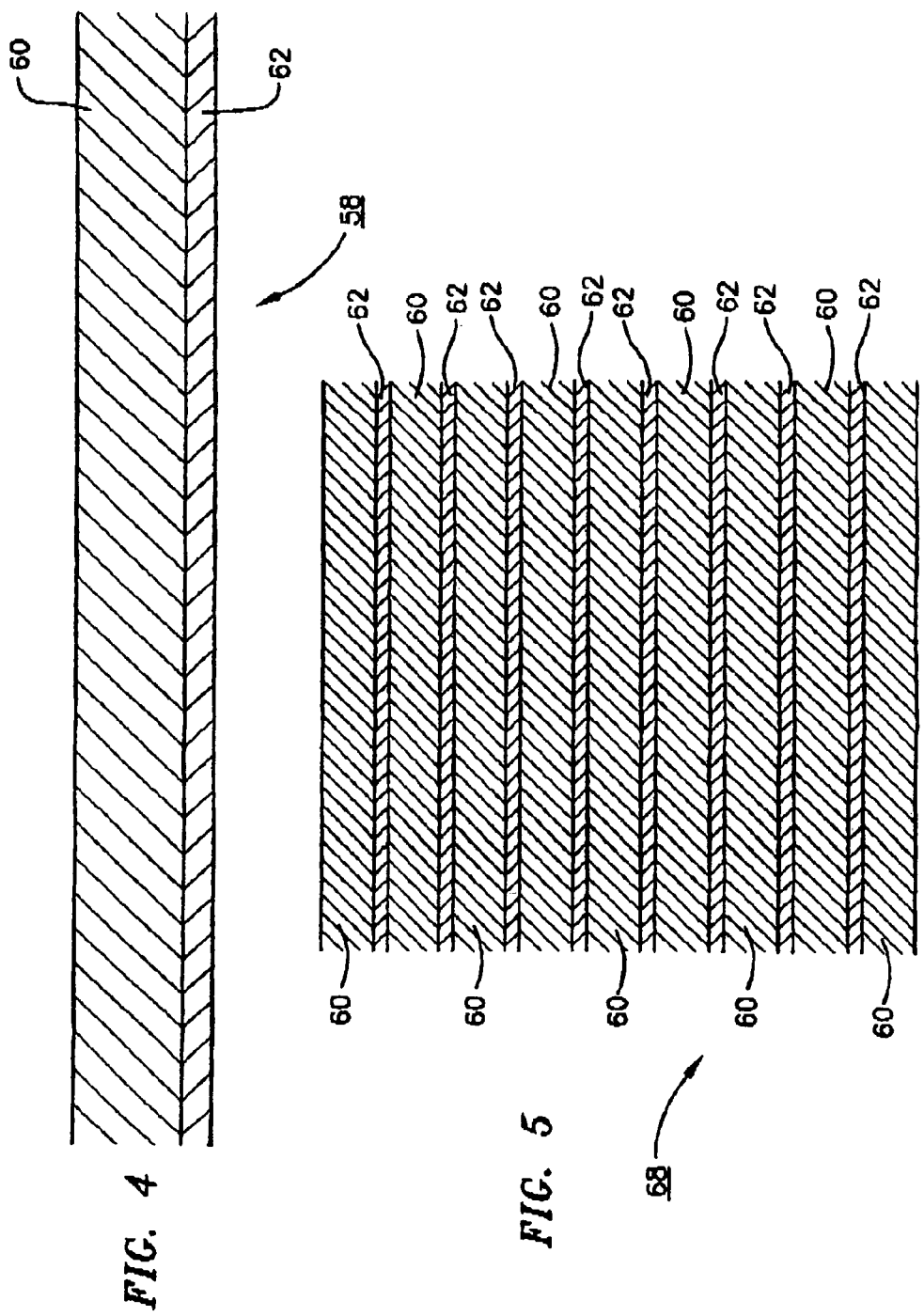

ULTRA HIGH MOLECULAR WEIGHT POLYETHYLENE BALLISTIC STRUCTURES

This application is a Continuation of U.S. patent application Ser. No. 11/217,277 filed Sep. 1, 2005 and now U.S. Pat. No. 7,348,053 which is a Continuation-in-part of U.S. patent application Ser. No. 10/926,681, filed Aug. 25, 2004 and now U.S. Pat. No. 6,951,685 which was a division of Ser. No. 09/999,083 filed Nov. 27, 2001, abandoned.

FIELD OF THE INVENTION

The present invention relates to thin tapes of ultra high molecular weight polyethylene fibers and tapes and to methods for their production and more particularly to fabrics woven from such materials that are suitable for use in ballistic structures.

BACKGROUND OF THE INVENTION

The processing of ultra high molecular weight polyethylene (UHMWPE), i.e. polyethylene having a molecular weight in excess of 5 million, is known in the polymer arts to be extremely difficult. Products made from such materials are, however, very strong, tough and durable.

In the following series of U.S. patents filed by Kobayashi et al and assigned to Nippon Oil Co., Ltd. a number of inventions related to the fabrication of fibers and films of polyolefins generally and UHMWPE specifically, are described: U.S. Pat. Nos. 4,996,011, 5,002,714, 5,091,133, 5,106,555, 5,200,129, and 5,578,373. The processes described in these patents are depicted schematically in FIG. 1 and generally describe the continuous production of high strength and high modulus polyolefin films by feeding polyolefin powder between a combination of endless belts disposed in an up and down opposing relationship, compression molding the polyolefin powder at a temperature below its melting point between the endless belts and then rolling and stretching the resultant compression molded polyolefin into an oriented film. Some of these patents also discuss the fibrillation of the resultant films and slitting of the films to form "fibers". As compression molded, the sheet is relatively friable thus requiring the subsequent stretching or drawing operations to provide an oriented film that exhibits very good strength and durability properties. In fact, the strength of such materials produced by these processes is 3 times that of steel on a weight basis and they exhibit very low creep. The UHMWPE films produced by the processes described in these patents have a final thickness of between 0.003" and 0.012".

While the thus produced materials quite obviously exhibit highly desirable properties, including useful ballistic properties, one of their major shortcomings is their relative stiffness that makes them difficult to "weave" and otherwise process into useful products. When woven, the resulting fabrics also tend to be very stiff and uncomfortable. This stiffness is largely a result of the fact that the fibers or tapes produced as just described are relatively "thick", i.e. on the order of more than about 3 mils. In order to obtain a material that can be easily woven to provide comfortable clothing and the like, and find use in such other applications as dental floss (another "high strength/thin material application") and high strength "thread" or fiber, it is necessary that the "thickness" of the UHMWPE film be reduced to below 3 mils and preferably below about 2 mils. Subsequent slitting and other treatments, for example fibrillation, can further contribute to the production of such products. Because of the high strength of these materials, it has been thought until now that the best approach to achieve such "thickness reduction" was to slit the film of the prior art into narrow strips (on the order of about 10 mils) and to stretch such narrow strips. This has proven largely unsuccessful since the material in such narrow widths will either refuse to stretch or break when elongated under conventional drawing and/or calendering processes. In fact, until the application of the methods described herein, to the best of our knowledge, no attempt to achieve draw ratios greater than 100, as would be necessary to meet the above-described requirements, has been successful. It is well known in the art that at a given thickness, the ballistic performance of an assembly is enhanced by having more layers due to the ability of multiple thinner layers acting in concert function more efficiently in ballistic applications.

It therefore would be most desirable to define a process whereby these high strength materials could be fabricated into films, sheets or tapes and "fibers" that are less than 3 mils and preferably below about 2 mils in thickness. The provision of such a process would open up entirely new applications for these materials in such diverse fields as ballistic structures.

OBJECTS OF THE INVENTION

It is therefore an object of the present invention to provide a method for the production of UHMWPE films having unique properties that make them amenable for use in structures that have not been possible to fabricate with similar prior art materials.

It is another object of the present invention to provide highly oriented UHMWPE slit film or sheets that can be fabricated into ballistic structures through lamination.

SUMMARY OF THE INVENTION

According to the present invention, there is provided a method for the production of a novel class of highly oriented slit films, fibers and sheets of highly oriented UHMWPE that are preferably below about 3 mils and more preferably below about 2 mils in thickness. The process involves: compression molding/compacting a very specific class of UHMWPE starting material under very carefully controlled temperature conditions to yield compacted tapes, fibers or sheets; and calendering and/or drawing the tapes, sheets, films or fibers thus produced under controlled tension at a temperature above the melting point of the UHMWPE material. Slitting of the resulting tapes, sheets, films or fibers with a heated knife results in the production of slit film fibers, films, tapes or sheets that find use in ballistic structures when laminated as described herein.

DESCRIPTION OF THE DRAWINGS

FIG. 4 is a cross-sectional view of a film, sheet or tape having an adhesive layer laminated thereto which laminated film, sheet or tape finds use in accordance with the present invention.

FIG. 5 is a cross-sectional view of a laminated composite in accordance with the present invention.

DETAILED DESCRIPTION

The method of the present invention provides a process for the production of a unique class of UHMWPE tapes/sheets/slit films and fibers that are preferably below 3 about mils and more preferably below about 2 mils in thickness. The process involves: compacting a very specific class of UHMWPE starting materials under very carefully controlled temperature conditions to yield compacted sheets; and drawing and calendaring the compacted under careful tension control at a temperature near the onset of melt of the UHMWPE material to produce thin fibers, films, tapes and sheets of UHMPE. Slitting of the resulting tapes, films, sheets or fibers with a heated knife results in such products that find use in such diverse applications as dental floss, personal armor, ballistic structures and sails for sail boats fabricated from woven or laminated materials of these fibers, films, tapes or sheets.

The term "tape" as used herein refers to products having widths on the order of or greater than about ½ inch and preferably greater than 1 inch, of a generally rectangular cross-section and having smooth edges and is specifically used to distinguish from the "fiber" product materials of the prior art of similar UHMWPE composition that were on the order of ⅛ of an inch wide or narrower and contained ragged or serrated edges about their periphery necessitating twisting in any weaving operation as is well known in the weaving arts. The term "slit film fiber" refers specifically to a "fiber" or narrow tape made in accordance with the present invention that exhibits a generally rectangular cross-section and smooth, i.e. non-serrated or ragged edges. The term "sheet" as used herein is meant to refer to thin sections of the materials of the present invention in widths up to and exceeding 160 inches in width as could be produced in large commercial equipment specifically designed for production in such widths and having the same generally rectangular cross-section and smooth edges. Hence, the fundamental difference between a "tape", a "slit film fiber" and a "sheet" as used to describe the products of the processes described herein relates to the width thereof and is generally independent of the thickness thereof.

Figure 1:
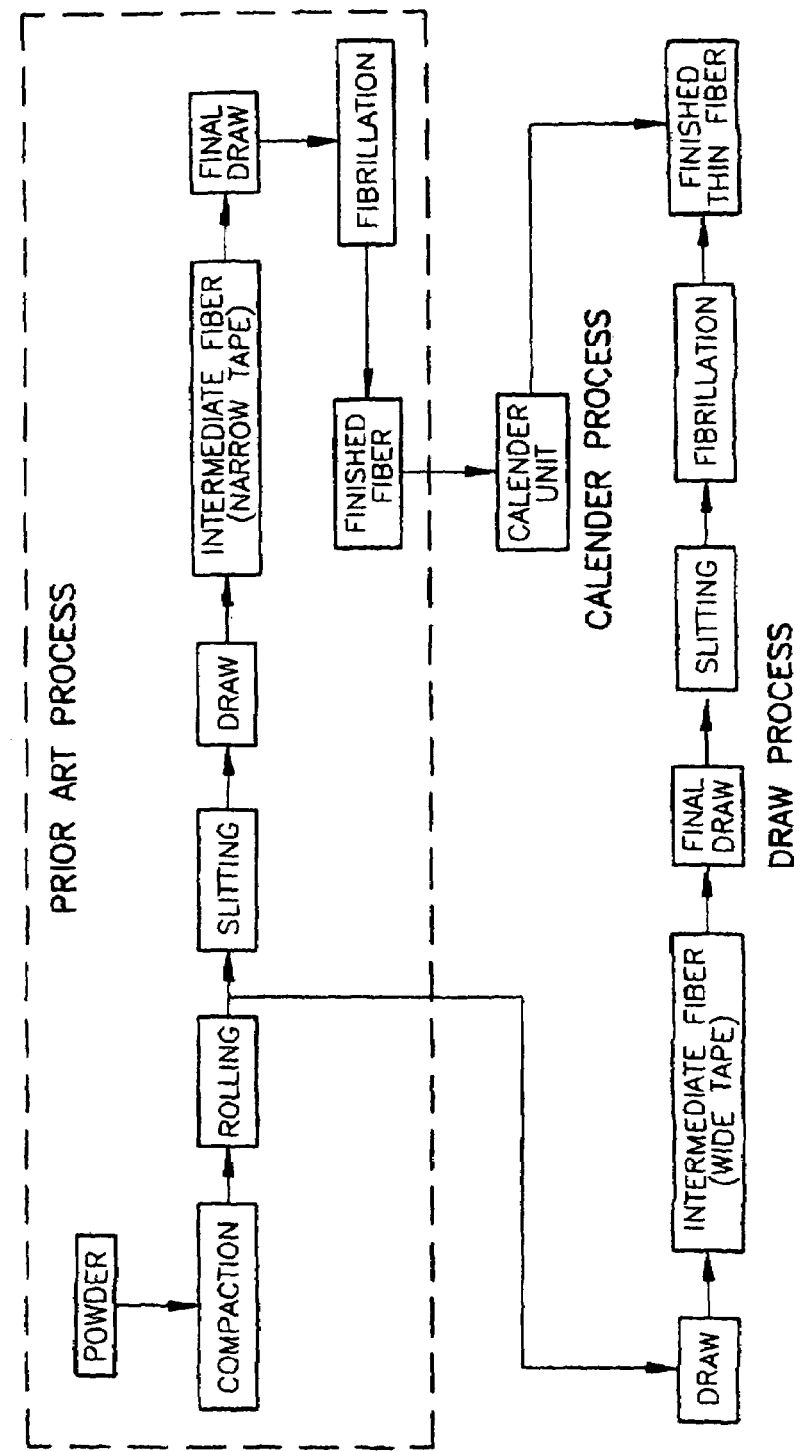
FIG. 1 is a schematic representation of the production process of the prior art and the thin fiber/film production processes of the present invention.

Referring now to FIG. 1, the processes described in the prior art and depicted schematically in FIG. 1 comprised the continuous production of high strength and high modulus polyolefin films by feeding polyolefin powder between a combination of endless belts disposed in an up and down opposing relationship, compacting the polyolefin powder at a temperature below its melting point between the endless belts and then rolling and stretching the resultant compression molded polyolefin into an oriented film. To the extent of their relevance to the modified processes described herein, the aforementioned prior art descriptions are incorporated herein by reference in their entirety.

The fundamental differences between the processes of the prior art and those described herein that result in the production of highly enhanced UHMWPE products begin with the selection of the UHMWPE input material. According to the present invention, the UHMWPE must exhibit high crystallinity (above about 80% as determined by differential scanning calorimetry), a heat of fusion equal to or greater than 220 joules/gram and low levels of entanglement. It is critically important to the successful practice of the present invention that the input starting material UHMWPE possess the degree of crystallinity and heat of fusion and meet the low entanglement requirements stated above. Such commercially available materials as Ticona X-168 from Ticona Engineering Polymers, 2600 Updike Road, Auburn Hills MI 48236 and type 1900 CM from Basell Corp. 2801 Centerville Road, Wilmington, Del. 19808 are useful in the successful practice of the present invention.

The second important difference between the process of the present invention and that described in the referenced prior art relates to the compaction step that is performed on the input UHMWPE input material to obtain the product form that forms the starting material for the drawing/calendaring steps. According to the preferred fabrication process of the present invention, the compaction step described in the prior art cited hereinabove is performed at a very carefully controlled temperature range. Since the UHMWPE materials do not exhibit a discrete "melt temperature" in the conventional sense but rather "melt" over a relatively wide temperature range of generally between about 135 (onset of melt) to about 138.5° C. (actual melting in the conventional sense). Hence while the preferred temperature range for compaction is below the melting point of the polymer, compaction can be performed over a temperature range between the onset of melt and melting, a range which will generally be about 4° C. Such a range can be generally described as between about 5 degrees below to about 4 degrees above the onset of melt of the polymer, ~130 to about 137 degrees C., and preferably at a temperature of from 2 degrees below the onset of melt of the polymer to about 1 degree above this temperature. Hence, compacting temperatures of between about 130° C. and about 143° C. are generally, but not necessarily, adequate for acceptable compaction depending upon the nature of the UHMWPE powder being so compacted. It should be noted that at higher compaction pressures the operative temperatures for this step can be somewhat lower than those described above. In the prior art, temperature control was not considered particularly critical and the only direction was that it be less than the melting point of the polymer. Compression ratios of from about 3:1 to about 9:1 and preferably between about 6:1 and about 8:1 have been found to yield optimum properties. Compaction in these ranges results in the production of a compacted sheet that is of very uniform density and thickness and suitable for further processing in accordance with the method of the present invention that results in the formation of the optimized products described herein. Compacted sheet exhibiting a density of between about 0.85 g/cm$^3$ and 0.96 g/cm$^3$ is preferred as the compacted sheet starting material for the subsequent drawing and calendaring processes.

Figure 2:
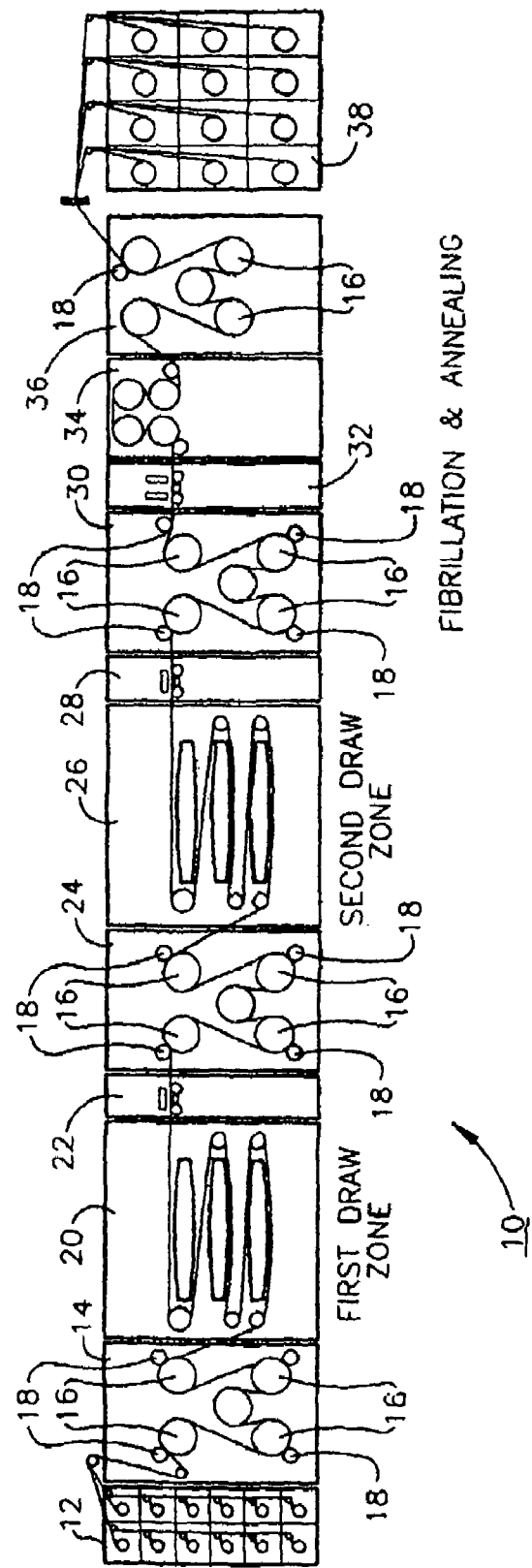
FIG. 2 is a schematic diagram of the drawing unit used to implement the process of the present invention.

Referring now to FIG. 2, the drawing apparatus utilized to achieve the thickness reductions of the compacted sheet produced as just described that result in production of the preferred UHMWPE products of the present invention 10 comprises:

a payoff 12, a godet stand 14 including heated godet rolls 16 (to anneal the product) and nip rolls 18 for establishing and maintaining tension in the line, a first draw zone 20, a first in-line tension sensor 22, a second godet stand 24, a second draw stand 26, a second in-line tension sensor 28, a third godet stand 30 and according to the preferred embodiment, a fibrillation unit 32, a nip roll stand 34 for maintaining tension and godet station 36 comprised of unheated take-up rolls 38. As seen from FIG. 1, the input or starting material of this process is generally the thick, compressed and rolled but unoriented product of the compaction step of the modified and carefully controlled prior art production process, modified as to the input UHMWPE and compacting conditions, as described above, that exhibits a thickness on the order of 10 mils or more. The input or starting material in the drawing/calendaring process steps described below is, of course, somewhat more sophisticated and narrowly defined in view of the native polymer input property requirements, i.e. degree of crystallinity, heat of fusion and low entanglement as is the compaction process that involves significantly more carefully controlled temperature conditions.

Each of the elements of the apparatus just described and utilized in the successful practice of the present invention are well known in the film and fiber drawing arts as is their combination in a line of the type just described. Consequently, no detailed description of such a line is required or will be made herein and the reader is referred to the numerous design manuals and descriptions of such apparatus commonly available in the art.

Similarly, the calendering apparatus depicted in FIG. 2 and described below requires no description beyond that presented immediately below as each of its elements and the combination thereof are well known in the fiber and film calendering arts and easily constructed in accordance with that general knowledge.

Referring now to FIG. 2, the calendering apparatus 40 useful in the production of the UHMWPE materials described herein comprises:

an unwind or payoff station 42, a tension control device 44, a preheat section 46, a pair of heated calender rolls 48, a second tension control section 50 and a rewind or take-up station 52. Preheat section 46 heats the input material to the temperatures described below prior to entry of the input material into calender roll pair 48. Calender rolls 48 are heated to impart the operating temperatures indicated below to the preheated input material and rotate the direction of arrows 54 shown in FIG. 3. The thickness of the UHMWPE product produced by calendering in the equipment depicted in FIG. 3 will, of course be dictated by the gap at nip 56 between calender rolls 48. Such gap can be controlled by either setting a fixed gap to produce product of the desired thickness or by applying a controlled pressure in nip 56.

While the calendering equipment just described is similarly generally old and well known in the prior art, the operation of same in the production of the UHMWPE films and fibers of the present invention is new and forms one core element of the process aspect of the present invention.

Figure 3:
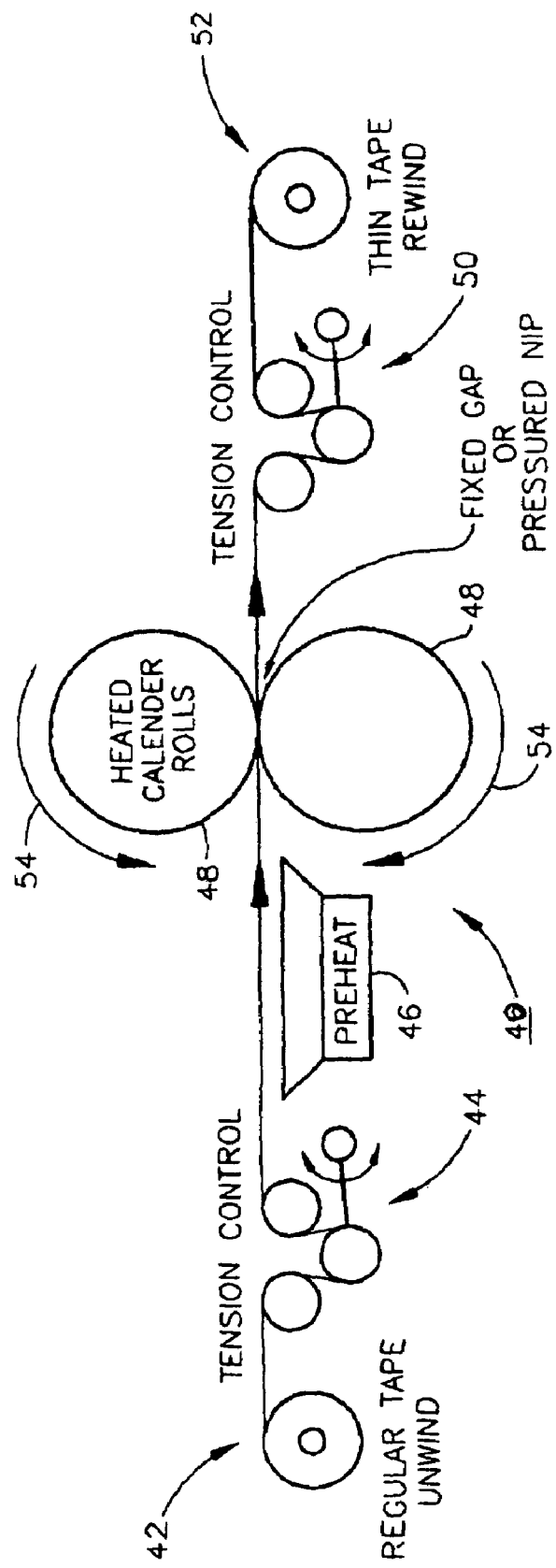
FIG. 3 is a schematic diagram of the calendering unit used to implement the process of the present invention.

Thus according to the present invention, input material comprising an UHMWPE "tape", "sheet" or "fiber" as produced in the modified prior art production processes described hereinabove, i.e. modified as to input material and temperature control is introduced into a drawing and calendering apparatus of the type just described and depicted in FIGS. 2 and 3. In the case of the drawing operation, the input material can be a "tape" having a width greater than about ⅛" and preferably in the range of 2.5 to about 3.0 inches, but it could be much wider given the availability of commercial equipment adequate in scale and power to perform the required operations. In the calendering operation, the input material is generally a "fiber" having a width below about ⅛". In either process, the input material described above is first preheated to a temperature near the onset of melt as described above, and drawing and calendering is accomplished by the application of 1) constant and controlled tension in the case of the drawing operation and 2) pressure with controlled tension in the case of the calendering operation at temperatures of between slightly below or above the onset of melt as previously described. Drawing is preferably performed at a temperature of between about 140° C. and about 158° C. and most preferably between about 148° C. and about 150° C. for commercially available UHMWPE compacted powders although variations in the UHMWPE compositions utilized as starting materials may allow for alteration of these temperature ranges. At temperature levels below the previously defined ranges, no significant thickness reduction will occur, while at temperatures above these ranges the material will tend to separate in the drawing and calendering operations. Calendering can in fact be performed over a very wide temperature range with the calendaring rolls being at temperatures from ambient to well above the actual melt temperature of the polymer depending upon such variables as equipment capabilities such as speed of calendaring, pressure applied, etc. The only true limitation being that the compacted and drawn sheet not melt during calendering.

Maintaining a controlled tension of between about 0.5 and about 5 g/denier, and preferably between about 0.8 and 3 g/dernier is also important to the production of product having the required "thinness" specified herein. Dernier as used herein is defined as the weight in grams of 9000 meters of the product film, sheet or fiber, during drawing and calendering, is also highly important to the successful production of a suitable product having the required "thinness" specified herein. At tension levels below 0.5 g/denier no significant drawing or reduction will be obtained while at tension levels above about 5 g/denier the material will tend to separate. In the case of drawing, tension is a function of the feed polymer and can vary broadly depending thereon and the ranges just specified refer to shoes found useful with particular commercial starting materials. The UHMWPE films, sheets, fibers or tapes produced by the process just described exhibit heats of fusion at or above about 243 joules/gram.

Total reductions achieved during drawing and calendaring will generally be between about 50:1 and about 170:1 or more depending again upon the input raw material and the end use to which the product is to be applied. Such total drawing and calendaring is computed as the multiple of each of the individual reductions achieved by each of the combined process steps.

After thickness reduction by calendering and/or drawing in the apparatus shown in FIGS. 2 and 3 and according to the processing parameters just described, various additional operations can be performed to make the product suitable for the various product applications described below, For example, as shown in FIG. 2, the drawing line or apparatus 10 may include a fibrillation roll or other apparatus for purposes of introducing short slits across the width of the product film, sheet or fiber. Fibrillation and the equipment used to produce it are both well known in the art and, in fact, were used in the prior art production processes. Fibrillation while often incorporated into the production lines for the materials described herein is not essential to the successful practice of the present invention. The tape, sheet, film or fiber output of the drawing and calendering processes can be slit to an appropriate width for the production of fibers and then subsequently fibrillated. As described below, special slitting treatments provide even more unique products.

As will be apparent to the skilled artisan, combinations of the calendering and drawing processes within the parameters described herein can easily be envisioned, and such combinations are intended to be within the scope of the appended claims.

As discussed hereinafter, the provision of smooth edges on the tape, sheet, film and fiber products described herein provides significant advantages over similar prior art products. The attainment of such smooth edges that result in many of the enhanced products described herein and the generally rectangular cross-section of such products can only be achieved using the slitting techniques described below. The use of conventional slitting knives as are used in the art in the production of, for example blown films, and as were used in the slitting portion of the prior art processes described above, while suitable for the production of fibers, sheets, tapes and films in accordance with the present invention have a major shortcoming in that they leave a serrated surface at the point of slitting. This serration can result in the generation of stress risers that weaken the laminates described hereinafter when they are applied in ballistic applications. Accordingly, it has been discovered that the use of heated slitting knives, heated to a temperature of above the melting point of the UHMWPE, i.e. above about 141°-142° C. must be used to provide an even or smooth surface suitable for use in ballistic structures and laminates. The application of the process just described in combination with slitting using heated knives results in the production of highly oriented ultra high molecular weight polyethylene slit film fibers, tapes, sheets and films that are of a generally rectangular cross-section and have smooth cut edges.

The production of laminated structures produced by laminating a plurality of layers of films or sheets of these materials either directly to each other or through the mechanism of an adhesive of one type or another, also provide products exhibiting desirable ballistic properties.

Referring now to FIGS. 4 and 5 attached hereto, FIG. 4 depicts a cross-section of a composite sheet material suitable for lamination in accordance with the present invention. As shown in FIG. 4 such a composite sheet 58 comprises a sheet 60 of UHMWPE material fabricated in accordance with the present invention having a layer of a sheet adhesive 62 laminated thereto. Such a sheet adhesive may comprise, for example, a layer of high density polyethylene having a thickness on the order of, for example 30μ, and exhibiting a melting point lower than that of the UHMWPE so that no weakening of the UHMWPE occurs during subsequent lamination operations as described below. Exposure of the UHMWPE sheet may result in diminution of the ballistics properties thereof. It is to be noted that, while a sheet adhesive forms one preferred embodiment of a method of joining sheets of UHMWPE in the laminated fabrics described below, other adhesive materials capable of joining alternating sheets of UHMWPE may be substituted therefore. These include for example vinyl ester adhesives, flexible epoxies etc. that could be similarly used. In point of fact, fabrics of alternating layers of the UHMWPE materials described herein can be laminated without adhesive by the simple step of applying even relatively low pressures of from about 5-10 psi up to over 150 psi while heating layers of the UHMWPE sheet to a point near the softening point of the material or about 152 degrees C.

FIG. 5 depicts a cross-sectional view of a laminated structure or panel 68 fabricated in accordance with the present invention utilizing the laminated composite shown in FIG. 4. As will be apparent to the skilled artisan, it is highly desirable that the alternating sheets of UHMWPE 60 be cross oriented, i.e. be laminated in alternating directions due to the significant orientation of these sheets induced by the drawing and/or calendaring operations described above and the consequent relative directional character of their various properties.

The ballistic properties/performance of UHMWPE materials, in particular the gel spun versions of such materials produced by Honeywell International, Richmond, Va. and sold under the trademark Spectra®, have been studied and reported widely. The ballistic performance of the materials described herein that can be produced at a significantly lower cost than the gel spun Spectra® fibers will be about equivalent to these prior art UHMWPE materials, but available at significantly lower cost due to the significantly reduced cost of their production. The strain rate sensitivity of these materials, i.e. their property of becoming stronger the faster strain is applied thereto, makes them particularly useful in ballistic applications where large strains are applied very quickly by an incoming threat.

Ballistic panels as claimed hereinafter are fabricated as just described by laminating a plurality of layers of the sheet/films described above, preferably in alternating orientations, and, of course need to be self-supporting in order to be practical for use as ballistic containers, buildings etc., i.e. closed structures, capable of withstanding ballistic forces whether addressed from within the structure (containment) or outside of the structure (protection). Self-supporting panels suitable for the construction/assembly of ballistic structures are generally, but need not be, above about ¼ inch and preferably above about ½ inch in thickness to provide basic levels of ballistic resistance and at least minimal structural strength when appropriately assembled into a container or building in a conventional fashion. There is no practical upper limit to the thickness of such panels except as may be imposed by the particular application or the ability to fabricate a certain thickness.

While it is theoretically possible to fabricate the ballistic panels described herein from the tapes or slit film fibers described hereinabove, it is probably cost prohibitive to do so, but such ballistic panels fabricated from these starting materials are intended to be within the scope of the appended claims.

There have thus been described a novel class of laminates made from UHMWPE slit films, tapes, or sheets that can be fabricated into laminated panels suitable for the construction of protective or containment structures.

As the invention has been described, it will be apparent to those skilled in the art that the same may be varied in many ways without departing from the spirit and scope of the invention. Any and all such modifications are intended to be included within the scope of the appended claims.

What is claimed is:

1. A ballistic panel comprising a laminated structure of a plurality of highly oriented ultra high molecular weight polyethylene slit film, sheets or tapes having a generally rectangular cross-section and smooth cut edges and a heat of fusion above about 243 joules/gram.

2. The ballistic panel of claim 1 wherein said ultra high molecular weight polyethylene slit film fibers, tapes, sheets or films have a thickness below about 3 mils.

3. The ballistic panel of claim 2 having a thickness above about ¼ inch.

4. The ballistic panel of claim 3 having a thickness above about ½ inch.

5. The ballistic panel of claim 3 comprising a plurality of individual layers of highly oriented ultra high molecular weight polyethylene slit film sheets or tapes having a generally rectangular cross-section and smooth cut edges and a heat of fusion above about 243 joules/gram laminated directly to each other without an adhesive mechanism.

6. The ballistic panel of claim 3 comprising individual layers of highly oriented ultra high molecular weight polyethylene slit film sheets or tapes having a generally rectangular cross-section and smooth cut edges and a heat of fusion above about 243 joules/gram laminated directly to each other with an adhesive mechanism.

7. A ballistic panel comprising a laminated structure of a plurality of highly oriented ultra high molecular weight polyethylene slit films having a generally rectangular cross-section and smooth cut edges and a heat of fusion above about 243 joules/gram.

8. The ballistic panel of claim 7 wherein said ultra high molecular weight polyethylene slit film fibers, tapes, sheets or films have a thickness below about 3 mils.

9. The ballistic panel of claim 8 having a thickness above about ¼ inch.

10. The ballistic panel of claim 9 having a thickness above about ½ inch.

11. The ballistic panel of claim 9 comprising a plurality of individual layers of highly oriented ultra high molecular weight polyethylene slit film having a generally rectangular cross-section and smooth cut edges and a heat of fusion above about 243 joules/gram laminated directly to each other without an adhesive mechanism.

12. The ballistic panel of claim 9 comprising individual layers of highly oriented ultra high molecular weight polyethylene slit film having a generally rectangular cross-section and smooth cut edges and a heat of fusion above about 243 joules/gram laminated directly to each other with an adhesive mechanism.

* * * * *